Dec. 28, 1926.   1,612,252
F. M. BEVERLY
BARBECUING DEVICE
Filed Dec. 18, 1925      2 Sheets-Sheet 1
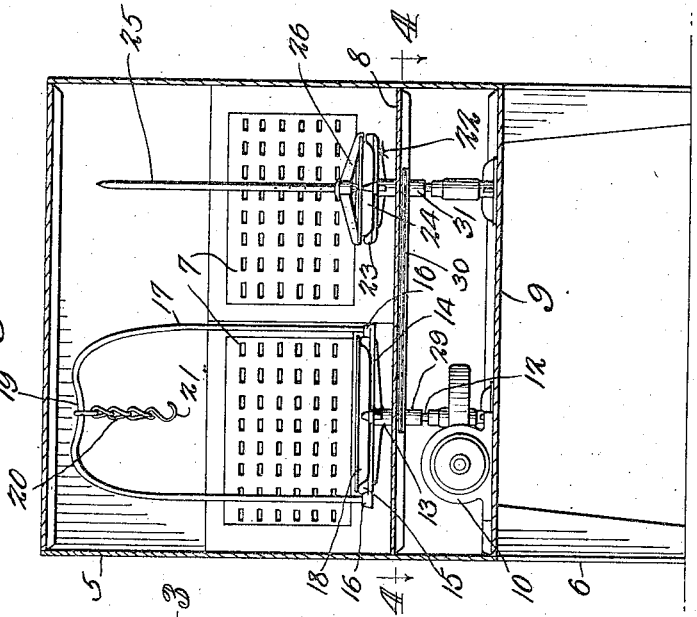
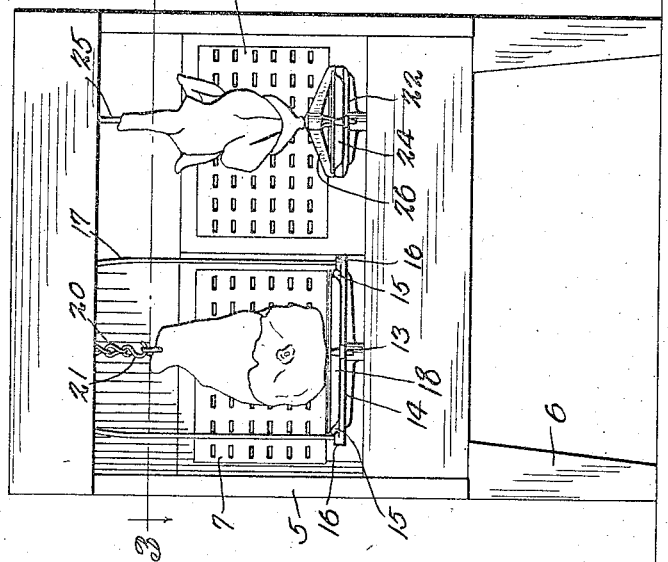
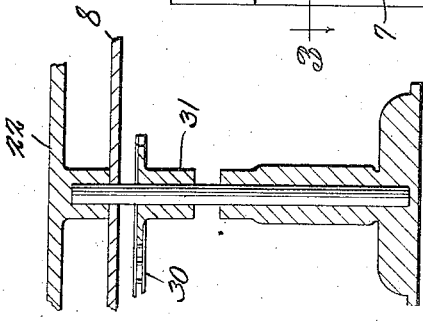
F. M. Beverly
Inventor,
By C. A. Snow & Co.
Attorneys.

Dec. 28, 1926.
F. M. BEVERLY
BARBECUING DEVICE
Filed Dec. 18, 1925    2 Sheets-Sheet 2
1,612,252
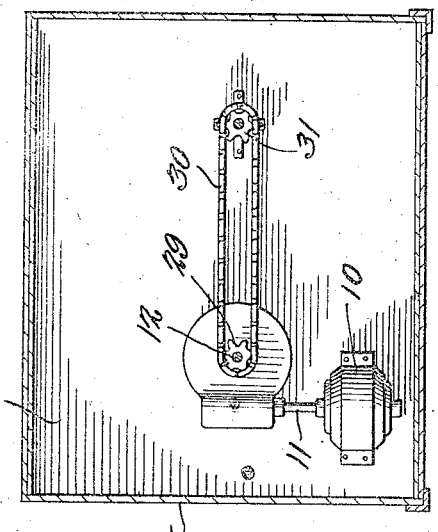
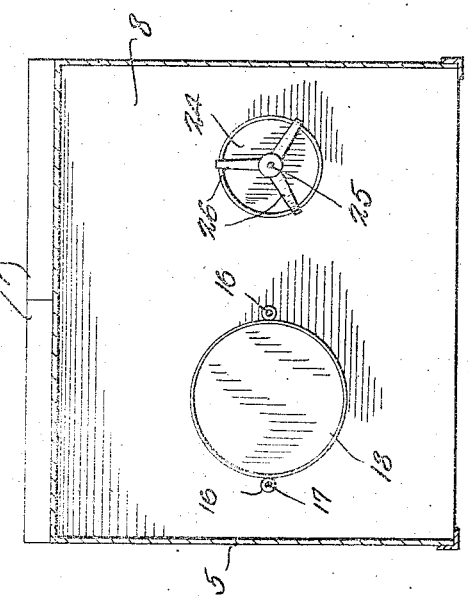
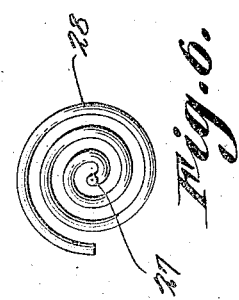
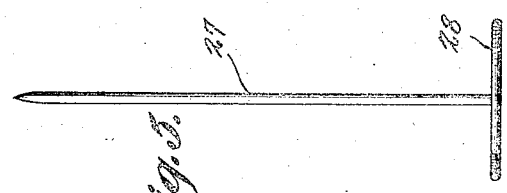
F. M. Beverly
Inventor Patented Dec. 28, 1926.

1,612,252

UNITED STATES PATENT OFFICE.

FRANK MILTON BEVERLY, OF COLUMBUS, OHIO.

BARBECUING DEVICE.

Application filed December 18, 1925. Serial No. 76,305.

This invention relates to an interior barbecuing device or broiler wherein the article being cooked is rotated before the burners supplying the heat.

An important object of the invention is to provide a device of this character which will support the meat or fowl being cooked in a vertical plane to the end that loading of the support may be carried out with facility.

Another object of the invention is to obviate the use of the usual horizontal spit or rod and provide means whereby the article under treatment may be supported in a vertical plane before the flames of the grill.

A still further object of the invention is to provide means whereby portions of the meat being cooked may be cut therefrom as soon as the surface of the meat is done, or where it is desirable to serve the meat with the original heat, which meat possesses a more desirable flavor.

Another object of the invention is to provide a device of this character wherein the mechanism for operating the device is concealed, the same being located below the bottom of the grill, eliminating all overhead and end body construction above the bottom member.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a front elevational view of a device constructed in accordance with the invention.

Figure 2 is a vertical sectional view through the device.

Figure 3 is a sectional view taken on line 3—3 of Figure 1.

Figure 4 is a sectional view taken on line 4—4 of Figure 2.

Figure 5 is an elevational view of a modified form of supporting rod or spit, which may be used in lieu of the bail and flexible hanger.

Figure 6 is a plan view thereof.

Figure 7 is a fragmental sectional view through the rotating mechanism.

Referring to the drawings in detail, the device includes a body portion indicated generally by the reference character 5 which is supported by means of the legs 6.

Within the body portion are arranged the heating elements 7 which may be either electric or of the gas burner type, the burner structure forming no part of this invention will not be described.

Disposed under the bottom 8 of the device is a bottom member 9 between which bottom members is supported the operating mechanism which includes an electric motor or other power 10 that operates the shaft 11, which in turn transmits rotary motion to the shaft 12, through a suitable gearing not shown.

This shaft 12 is of a length to extend above the bottom member 9 where it is passed into an opening formed in the boss 13, formed integral with the support 14 which is in the form of radially extended arms, which arms have upwardly extended outer end portions 15 and 16 respectively, the end portions 16 having suitable openings for the reception of the lower ends of the supporting bail 17. The outer end portions 15 and 16 also define shoulders to engage the outer edge of the tray 18, to the end that the tray may be readily and easily removed for cleaning purposes.

The upper portion of the bail 17 is slightly depressed as at 19, to which depressed portions is secured the uppermost link of the chain 20 that has a hook portion 21 forming its opposite end so that the hook portion may be forced into the meat being cooked to secure the meat to the chain.

In this way, it will be readily seen that the meat will be supported vertically and rotated before the burners in a vertical plane.

It is contemplated in the use of the device to construct the same so that several roasts or pieces of meat may be cooked simultaneously and to this end, the supporting member which embodies the arms as previously described may be removed and a supporting member of a smaller diameter such as indicated at 22, may be substituted therefor.

The arms forming the supporting member 22 are also formed with upwardly extended end portions 23 which act as shoulders for the relatively small tray 24. When a vertical supporting rod is to be used such as shown at 25, the rod is positioned directly over the tray 24, there being provided arms 26 at the lower end of the rod 25, which arms have notches formed at their outer ends defining shoulders to permit the arms to be positioned over the upper edge of the tray in a manner as clearly shown by Figure 2 of the drawings.

A sprocket wheel such as indicated at 29 is mounted on the shaft 12 and transmits rotary motion to the adjacent shaft through the chain 30 which also operates over the sprocket wheel 31 carried by the opposite shaft, as shown by Figure 4.

From the foregoing detailed description, it is believed that a further detail description as to the operation of the device is unnecessary.

I claim:

In a device of the character described, a base, a partitioning member positioned above the base and disposed in spaced relation therewith to provide a compartment, gearing in the compartment, a vertical shaft extending through the partitioning member, means within the compartment for rotating the shaft, a removable supporting member including radiating arms positioned on the upper end of the shaft, said arms having upwardly extended end portions for supporting a tray therebetween, a vertical supporting rod adapted to be extended through the article being cooked, arms radiating from the lower end of the rod, said arms having notches adjacent to the outer ends thereof, said notches adapted to be fitted over the upper edge of the pan to removably support the rod, and said rod adapted to operate in a vertical plane.

In testimony that I claim the foregoing as my own, I have hereto affixed my signature.

FRANK MILTON BEVERLY.